United States Patent [19]

Smith

[11] Patent Number: 4,984,425
[45] Date of Patent: Jan. 15, 1991

[54] ACCELERATION CONTROL FOR A GAS TURBINE ENGINE

[75] Inventor: Jesse W. Smith, Stuart, Fla.

[73] Assignee: United Technologies Corporation, Hartford, Conn.

[21] Appl. No.: 359,186

[22] Filed: May 30, 1989

[51] Int. Cl.⁵ .............................................. F02C 9/28
[52] U.S. Cl. ................................ 60/39.161; 60/39.181
[58] Field of Search ................ 60/39.161, 39.281, 243, 60/226.1

[56] References Cited

U.S. PATENT DOCUMENTS 3,882,672  5/1975  Bauerfeind ...................... 60/39.281
4,117,668  10/1978  Elsaesser et al. ................ 60/39.281
4,228,650  10/1980  Camp .............................. 60/39.281

*Primary Examiner*—Louis J. Casaregola
*Attorney, Agent, or Firm*—Norman Friedland

[57] ABSTRACT

A control to control the acceleration mode for a gas turbine engine so as to allow the engine to accelerate rapidly with adequate stall margin by simulating a compressor stall limit. The stall limit is attained by generating a limiting ratio of burner pressure and another engine pressure as a function of corrected compressor rotor speed assuming that the stall margin is independent of compressor bleed, power extraction and degradation of engine efficiency.

9 Claims, 1 Drawing Sheet

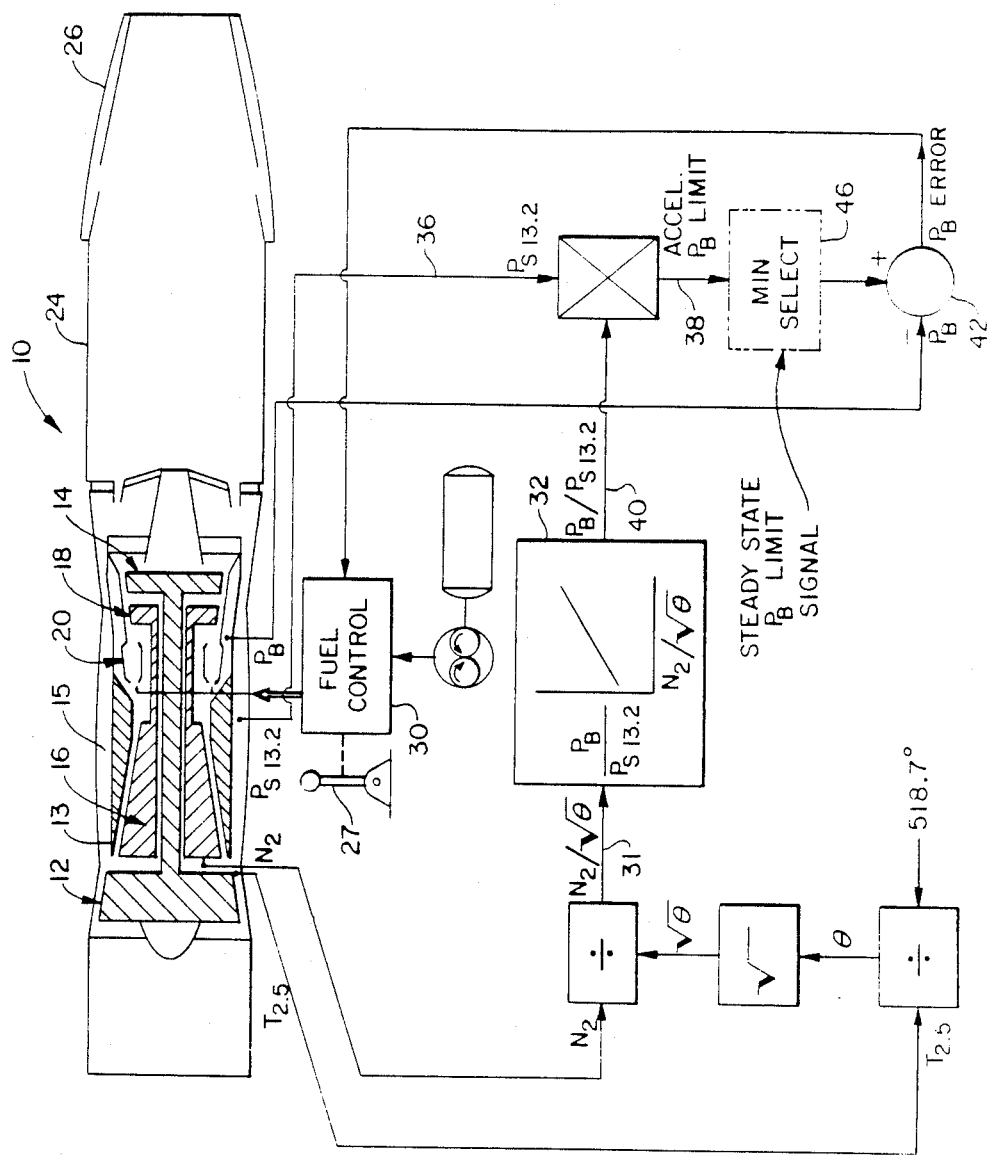

ACCELERATION CONTROL FOR A GAS TURBINE ENGINE

The invention was made under a U.S. Government contract and the Government has rights herein.

CROSS REFERENCE TO RELATED APPLICATION

This application relates to commonly assigned U.S. Pat. Application Ser. No. 359,451 filed on even date herewith for "Acceleration Control With Duct Pressure Loss Compensation" by Jesse W. Smith.

TECHNICAL FIELD

This invention relates to gas turbine engines for powering aircraft and more particularly to that portion of the control system designed to control the engine's operation during acceleration.

BACKGROUND ART

As is well-known, gas turbine engines that utilize axial flow compressors are subject to stall and surge. Stall may occur in the compressor when the angle of attack and other conditions are such that the boundary layer of the air adjacent to the compressor blades separates inducing a pressure pulsation. If the pulsation does not subside and is allowed to propagate to other blades, the entire compressor will surge which could lead to an engine malfunction. The industry has attempted to eliminate surge or provide means for insuring that surge will not ensue, and if so, in situ, a remedy is designed to obviate the condition.

Historically, fuel controls are designed to provide an open loop schedule that has sufficient surge margin to assure that the engine can be accelerated without incurring surge. The accepted philosophy for such schedules is to provide sufficient margin between the engine operating line and the surge line at the worst operating condition so that no matter what engine condition is encountered, surge will be avoided. The margin provided using this philosophy is a compromise between the rate of acceleration which could be achieved under the safest operating conditions and the surge margin required for the worst operating conditions. Since acceleration time is always sacrificed in favor of avoiding surge, accelerations are not as rapid as possible when operating at conditions other than the worst possible combination. Of course, it is ideal to accelerate the engine as rapidly as possible, so that in this scenario any means that will assure avoidance of surge while allowing rapid acceleration at all operating conditions is a desirable objective in this art.

Since the surge margin required for acceleration is normally dictated by the most severe operation the engine may encounter (even though that situation hardly arises, if ever), it is quite apparent that the engine operation can be enhanced at most operating conditions merely by ignoring the worse case scenario. Obviously, such is an unacceptable solution to the problem, since surge must be avoided at all operating conditions to assure flight safety.

As is well-known, fuel controls such as the JFC-12, JFC-60 and JFC-68 manufactured by the Hamilton Standard Division of United Technologies Corporation, the assignee of this patent application, provide open loop schedules with sufficient stall margins for avoidance of stall in all contemplated operations of the engines. For details of acceleration controls reference should be made to the aforementioned control models. Such control systems manifest a control parameter that is indicative of (where $Wf/P_B$ is fuel flow rate in pounds per hour and $P_B$ is burner pressure in pounds per square foot absolute). This parameter varies as a function of compressor speed (either the low compressor $N_1$ or the high compressor $N_2$) in a twin spool engine and other engine parameters selected to correct the speed to a base line value and is multiplied by actual burner pressure ($P_B$) or its equivalent to schedule the proper fuel flow to the engine for acceleration.

Other engine control schemes may utilize a $\dot{N}_1$ or $\dot{N}_2$ (rate of change signal) to provide the same function as the $Wf/P_B$ parameter. But, in either instance or by a combination of the two, the stall margin is excessive and/or inherently provides slow accelerations when not operating under worst case conditions. Such inadequacies of these systems are acerbated even further when engine operations deviate from the norm due to power extraction, compressor bleed and engine efficiency degradation.

I have found that I can provide a control scheme that assures the optimum acceleration (most rapid) without risk of compressor stall with any combination of bleed, power extraction and engine condition. This invention contemplates a closed loop system which provides an acceleration control which generates a simulated compressor stall limit signal which is converted to a desired burner pressure limit. This limit is calculated by selecting a desired engine pressure ratio as a function of corrected high pressure compressor rotor speed and closing the loop on actual burner pressure to control fuel flow to the burner. The error between the actual burner pressure signal and simulated compressor stall limit signal determines the rate of fuel flow during acceleration, properly accounting for compressor bleed, power extraction and degradation of engine efficiency.

DISCLOSURE OF INVENTION

An object of this invention is to provide an improved acceleration mode for a gas turbine power plant that provides adequate stall margin independent of compressor bleed, power extraction, and degradation of engine efficiency.

A feature of this invention is to provide for an aircraft turbine type power plant, an acceleration mode that is characterized as being extremely rapid, easy to adapt to existing controls and compatible with steady-state controls having fan or engine pressure ratio and burner pressure limits.

Another feature of this invention is to provide a closed loop acceleration control that simulates a compressor stall limit by generating a limiting ratio of burner pressure and other engine pressure as a function of corrected high pressure compressor rotor speed and closing the loop on actual burner pressure by controlling fuel flow to the burner.

A still further feature of this invention is to provide an acceleration control that can be implemented electronically, either by analog or digital controls, while utilizing current state-of-the-art technology including the use of existing sensed parameters and control systems.

The foregoing and other features and advantages of the present invention will become more apparent from the following description and accompanying drawings.

BRIEF DESCRIPTION OF THE DRAWINGS

The sole Figure is a schematic illustration of a twin spool, axial flow gas turbine fan jet engine with augmentor including a block diagram of an acceleration control embodiment of this invention.

BEST MODE FOR CARRYING OUT THE INVENTION

While, in its preferred embodiment this invention is intended for utilization on a twin spool, axial flow gas turbine fan-jet military type engine, it will be appreciated that it has utility in other types of engines, such as straight jets and engines used in nonmilitary applications. The invention is described herein as being implemented electronically as shown in its analog logic form. It is to be understood that it is intended for use in an all electronic digital type control, such as the controls used on the F-100 family of engines known by the acronym of DEEC (Digital Electronic Engine Control) and the controls planned for use on the F119 family of advanced engines known by the acronym of FADEC (Full Authority Digital Electronic Control) which are incorporated herein by reference. The F100 family of military engines is manufactured by Pratt & Whitney Aircraft, a division of United Technologies Corporation, the assignee of this patent application, and the F119 is currently being developed for future military applications.

The twin spool, axial flow fan jet engine illustrated by the reference numeral 10 is shown in a simplified form in the sole Figure as comprising a low pressure spool having a fan/low pressure compressor section 12 driven by a low pressure turbine section 14 and a high pressure spool comprising a high pressure compressor section 16 driven by the high pressure turbine section 18. An annular burner 20 is fed fuel that combusts with the pressurized air admitted to the burner to generate hot gases to power the turbines. Air discharging from the fan 12 is split by splitter 13 so that a portion enters the core engine and a portion is bypassed through bypass duct 15 to mix with the core discharge gas.

As is apparent from the foregoing, the combustion gases discharging from the turbine (core engine) together with the fan discharge air are eventually discharged through an exhaust nozzle imparting thrust to the engine. In many military applications and some other applications as well, an augmentor is employed as is disclosed in this preferred embodiment. The augmentor 24, as the name emphasizes, adds additional thrust to the engine by burning fuel in a secondary combustor section. In this instance, the augmentor includes suitable fuel nozzles, a flame holder and the exhaust nozzle 26. The exhaust nozzle 26 is variable to assure that the proper engine thermodynamic cycle is maintained in both augmented and nonaugmented operation. In aircraft applications, it is typical to extract power from the engine for purposes other than generating thrust and bleed air from the compressor.

As is customary, the fuel supplied to the burner is regulated by the fuel control to assure that the proper amount of fuel is delivered to automatically maintain optimum, or nearly so, engine operation for both steady-state and transient conditions for given power lever 27 positions. Hence, a suitable fuel control represented by reference number 30 is shown by the box and may be any available state-of-the-art control which may be executed electronically, mechanically, hydraulically, hydro-mechanically or the combination thereof. Suffice it to say, that these current state-of-the-art controls typically sense speeds, temperatures and pressures which mechanisms can be utilized with this invention.

As is best shown schematically in the sole Figure, the acceleration control of this invention generates a corrected speed signal $(N_2/\sqrt{\theta})$. The correction is obtained by referencing a compressor inlet temperature $(T_{2.5})$ (the subscript 2.5 references a particular station designation in the engine, which designation can vary with different engine families and models) to the sea level temperature value (518.7 Rankine) by straightforward computations. The compressor inlet temperature used in this calculation can be a sensed value or calculated from other sensed values. This produces a signal in line 31 indicative of $N_2/\sqrt{\theta}$ is applied as the input to the function generator 32. The function generator 32 produces a limit signal designated as the parameter $(P_B/PS_{13.2})$ where the subscript 13.2 is indicative of some station downstream of the fan, and in the preferred embodiment this value is indicative of the pressure in the fan bypass duct prior to the inlet of the augmentor (line 36). Of course, other pressures (P2.5, P16, P6, etc.) may be equally valid and substituted therefor as one skilled in this art will appreciate. The value of $P_B/PS_{13.2}$ serves to approximate the pressure ratio across the high pressure compressor 16. As shown by actual test data, there is an excellent correlation between these two ratio values (the ratio of $P_B/PS_{13.2}$ and pressure ratio of the high pressure compressor) since the fan bypass duct pressure (line 36) is directly linked to inlet pressure of the high pressure compressor 16 via the fan bypass duct 15. Also, it is well-known that burner pressure is almost equal to high compressor discharge pressure.

It is apparent from the foregoing that by utilizing this correlation noted above and as shown in the sole Figure, the output of function generator 32 defines the $P_B/PS_{13.2}$ limit schedule. Since the high pressure compressor stall limit is plotted as a function of corrected rotor speed $(N_2/\sqrt{\theta})$, stall margin can be selected to account for engine-to-engine variations in high compressor stall limits and inlet distortions. Also, since the $P_B/PS_{13.2}$ limit is combined with measured fan bypass pressure (line 36) the parameter establishes a $P_B$ duct limit for engine acceleration. The PB limit signal in line 38 is the product of the output of function generator 32 in line 40 $(P_B/Ps_{13.2})$ and $PS_{13.2}$ (line 36) which is the fan bypass duct pressure. Hence, the $P_B$ limit is independent of the power extraction, compressor bleed and engine degradation and the stall margin need not be established to account for those conditions.

The comparator 42 compares the $P_B$ limit signal and actual $P_B$ to produce an error signal that serves to close the loop on $P_B$ by varying fuel flow through the fuel control.

A minimum select gate 46 may be utilized if it is desired to select between the steady-state burner pressure limit manifested by the fuel control 30 and the $P_B$ limit signal manifested by the present invention. This option would be predicated on the particular application to which this invention is used.

The logic disclosed in FIG. 1 can be used as a trim (or "topper") for control schemes using an $\dot{N}_2$ acceleration mode. When used as a "topper", the very repeatable transient times possible with $\dot{N}_2$ could be assured without risk of stall when engine conduit or power extraction would not permit nominal $\dot{N}_2$ acceleration rate.

However, use of the $P_B/PS_{13.2}$ acceleration mode alone would always provide the fastest transient possible.

Although this invention has been shown and described with respect to detailed embodiments thereof, it will be understood by those skilled in the art that various changes in form and detail thereof may be made without departing from the spirit and scope of the claimed invention.

I claim:

1. An acceleration control for a gas turbine engine for controlling the acceleration mode of said engine, said engine having a compressor subject to stall, a burner for generating engine working fluid medium, a turbine powered by said engine working fluid medium for driving said compressor, fuel control means responsive to engine operating parameters for controlling the flow of fuel to said burner, said acceleration control comprising means for establishing a stall margin for said compressor including means responsive to compressor rotor speed for establishing a first signal simulating a compressor stall limit indicative of the ratio of the pressure of said burner and the pressure at another station in said engine, means responsive to actual burner pressure for generating a second signal and means responsive to said first signal and said second signal for adjusting said fuel control means to limit the flow of fuel to said burner wherein said stall margin is independent of compressor bleed, power extraction from said engine and degradation of engine efficiency.

2. An acceleration control as claimed in claim 1 wherein said engine includes a fan, a fan bypass duct for flowing fan discharge air and an augmentor, said other station being in said bypass duct.

3. An acceleration control as claimed in claim 2 including means responsive to the actual pressure in said bypass duct to produce a third signal, and multiplying means for multiplying said first signal and said third signal for producing a fourth signal indicative of a limiting value of the pressure in said burner means responsive to the error between said fourth signal and actual burner pressure for further controlling said fuel control means.

4. An acceleration control as claimed in claim 3 wherein said firs signal is responsive to compressor speed corrected to a base line value indicative of a temperature at the inlet of said compressor of 518.7 degrees Rankine.

5. An acceleration control as claimed in claim 4 wherein said fuel control means establishes a steady-state signal limiting the value of the pressure in said burner and a minimum select means for selecting the minimum value between said steady-state signal and said fourth signal for controlling said error responsive means.

6. For a twin spool, axial flow fan jet engine having a high pressure compressor and a low pressure compressor driven respectively by a high pressure turbine and a low pressure turbine, a burner for generating gases for powering said high pressure turbine and said low pressure turbine, fuel control means for regulating the flow of fuel to said burner in combination with acceleration means to control said engine during the acceleration mode of operation, including means for generating a corrected high pressure compressor rotor speed for establishing a first signal, function generating means responsive to said first signal establishing a simulated stall limit indicative of a limiting ratio of burner pressure to another engine operating parameter for generating a second signal, multiplying means responsive to the actual value of said parameter and said second signal for producing a third signal indicative of the limit of said burner pressure during said acceleration mode, means responsive to actual burner pressure and said third signal to produce an error signal for further controlling said fuel control means so as to establish a stall margin for said high pressure compressor during said acceleration mode of said engine.

7. For a twin spool, axial flow fan jet engine as claimed in claim 6 including a bypass duct for flowing the fan discharge air, said parameter being the pressure in said bypass duct.

8. For a twin spool, axial flow fan jet engine as claimed in claim 7 wherein said fuel control means includes means for generating a fourth signal indicative of the limit of said burner pressure during steady-state engine operations, gate means responsive to the minimum value between said third signal and said fourth signal for establishing the error between said actual burner pressure and said third signal or said fourth signal.

9. For a twin spool, axial flow fan jet engine as claimed in claim 6 including an augmentor, said other engine operating parameter is an engine pressure upstream of said augmentor.

* * * * *

UNITED STATES PATENT AND TRADEMARK OFFICE
CERTIFICATE OF CORRECTION

PATENT NO. : 4,984,425

DATED : January 15, 1991

INVENTOR(S) : Jesse W. Smith

It is certified that error appears in the above-identified patent and that said Letters Patent is hereby corrected as shown below:

Column 2, line 4, after "of" insert --$W_f/P_B$--

Column 2, line 15, before "is" insert --which--

Column 4, line 67, change "conduit" to --conditions--

Signed and Sealed this

Sixth Day of April, 1993

Attest:

STEPHEN G. KUNIN

*Attesting Officer*     Acting Commissioner of Patents and Trademarks